(12) United States Patent
Hazeyama et al.

(10) Patent No.: US 7,322,916 B2
(45) Date of Patent: Jan. 29, 2008

(54) TOOL MAGAZINE DEVICE FOR VERTICAL MACHINING CENTER

(75) Inventors: Minoru Hazeyama, Aichi pref. (JP); Takeshi Yasuda, Aichi pref. (JP)

(73) Assignee: Yamazaki Mazak Corporation, Aichi pref (JP)

( * ) Notice: Subject to any disclaimer, the term of this patent is extended or adjusted under 35 U.S.C. 154(b) by 0 days.

(21) Appl. No.: 11/534,689

(22) Filed: Sep. 25, 2006

(65) Prior Publication Data

US 2007/0078044 A1   Apr. 5, 2007

(30) Foreign Application Priority Data

Oct. 4, 2005   (JP)   ............... 2005-291059

(51) Int. Cl.
*B23Q 3/155* (2006.01)

(52) U.S. Cl. .................. 483/68; 483/38; 211/1.56

(58) Field of Classification Search ................ 483/62, 483/65, 32, 38, 40, 41, 43, 46, 55, 59, 68, 483/1, 8, 14; 29/558; 211/1.56
See application file for complete search history.

(56) References Cited

U.S. PATENT DOCUMENTS

| | | | | |
|---|---|---|---|---|
| 3,817,391 A | * | 6/1974 | Lohneis et al. ............ 211/1.56 |
| 3,932,924 A | | 1/1976 | Anderson |
| 4,087,901 A | * | 5/1978 | Lohneis et al. ................ 483/8 |
| 4,182,021 A | * | 1/1980 | Kato et al. .................... 483/59 |
| 4,288,909 A | * | 9/1981 | Kielma et al. ................ 483/41 |
| 4,306,350 A | * | 12/1981 | Kielma et al. .................. 483/1 |
| 4,312,111 A | | 1/1982 | Peiser et al. |
| 4,343,077 A | * | 8/1982 | Satoh et al. .................. 483/41 |
| 4,427,325 A | * | 1/1984 | Kielma et al. .............. 409/144 |
| 4,670,965 A | * | 6/1987 | Sato et al. .................... 483/46 |
| 4,773,152 A | * | 9/1988 | Kitamura ..................... 483/46 |
| 4,837,919 A | | 6/1989 | Hoppe |
| 4,893,399 A | * | 1/1990 | Hammer ...................... 483/62 |
| 5,439,434 A | * | 8/1995 | Sato et al. ..................... 483/1 |
| 5,453,068 A | * | 9/1995 | Rutschle et al. ............. 483/38 |

(Continued)

FOREIGN PATENT DOCUMENTS

EP   0 307 691   8/1988

(Continued)

OTHER PUBLICATIONS

European Search Report for corresponding Application No. 06405397 dated Dec. 29, 2006.

*Primary Examiner*—Dana Ross
(74) *Attorney, Agent, or Firm*—Renner, Otto, Boisselle & Sklar, LLP

(57) ABSTRACT

The invention provides a tool magazine device for a vertical machining center having a protective cover for a shank. A tool magazine device 100 disposed in a vertical machining center comprises a chain 120 moved between sprocket wheels 130 and 140, and the chain 120 is equipped with tool holders 200. Each tool holder 200 has a tool holder member 220 for holding the shank portion of the tool 1 and a shank pod 230 for covering the shank portion. The automatic tool change preparation device 300 lifts the shank pod 230 by gripping a knob 250 of a shaft 240 connected to the shank pod 230, so as to enable an automatic tool change arm to change the tool 1.

10 Claims, 8 Drawing Sheets

U.S. PATENT DOCUMENTS

| | | | |
|---|---|---|---|
| 5,542,899 A | * | 8/1996 | Yamada et al. ................ 483/32 |
| 5,692,984 A | * | 12/1997 | Kayatani et al. ............ 474/205 |
| 5,945,009 A | * | 8/1999 | Beck et al. .............. 219/69.11 |
| 5,971,904 A | * | 10/1999 | Soltermann et al. .......... 483/68 |
| 6,003,416 A | | 12/1999 | Ando et al. |
| 6,066,078 A | * | 5/2000 | Koelblin et al. .............. 483/55 |
| 6,450,932 B1 | * | 9/2002 | Hirose et al. ................ 483/40 |
| 6,485,401 B2 | * | 11/2002 | Gorrochategui ................ 483/1 |
| 2003/0115736 A1 | * | 6/2003 | Kurz et al. ................... 29/558 |

FOREIGN PATENT DOCUMENTS

| | | |
|---|---|---|
| JP | 08-257861 | 10/1996 |
| JP | 11-347870 | 12/1999 |

* cited by examiner

TOOL MAGAZINE DEVICE FOR VERTICAL MACHINING CENTER

The present application is based on and claims priority of Japanese patent application No. 2005-291059 filed on Oct. 4, 2005, the entire contents of which are hereby incorporated by reference.

BACKGROUND OF THE INVENTION

1. Field of the Invention

The present invention relates to a tool magazine device for a vertical machining center.

2. Description of the Related Art

One type of tools used in a machining center is an HSK tool having two sides restrained, a tapered surface and a spindle end surface, to realize high-speed and high-accuracy processing.

FIG. 7 illustrates a tool 1 of the above type, wherein a shank 10 which is a tool holder is mounted on a tool body 2.

FIG. 8 shows a spindle 20 of a vertical machining center to which the tool 1 is attached. The shank 10 has an outer tapered portion 11 and an inner clamp portion 12, wherein the tool is clamped by having a clamp claw 22 of a spindle 20 grip the clamp portion 12 of the shank 10.

When this type of tool is used for the vertical machining center, there is a drawback in that during the state in which the tool 1 is removed from the spindle 20, the shank 10 defines a space 14 with a bottom opening to the upper direction, into which particles such as chips may enter.

Thus, the machining center using this type of tool is designed so that the axis of the tool is arranged in the horizontal direction.

Tool holder devices for holding such tools are disclosed in Japanese Patent Application Laid-Open Publication Nos. 11-347870 and 8-257861.

SUMMARY OF THE INVENTION

The object of the present invention is to provide a tool magazine device for a vertical machining center.

In order to achieve the object of the present invention, the tool magazine device of the present invention comprises a chain suspended between a pair of sprocket wheels and moved thereby, and vertical tool holders attached to the chain, wherein the tool holder comprises a shank pod for covering a tool shank and an elevating means for elevating and lowering the shank pod.

In addition, the tool magazine device comprises an automatic tool change preparation device positioned on the side where one of the sprocket wheels is disposed, the automatic tool change preparation device having a function to automatically elevate and lower the shank pod of the tool holder, and the tool magazine device further comprises a manual tool change preparation device positioned on the side where the other sprocket wheel is disposed, the manual tool change preparation device having a function to manually elevate and lower the shank pod of the tool holder.

According to the arrangements mentioned above, the tool magazine device of the present invention can be applied to a vertical machining center utilizing the HSK tool.

DETAILED DESCRIPTION OF THE PREFERRED EMBODIMENTS

Figure 1:
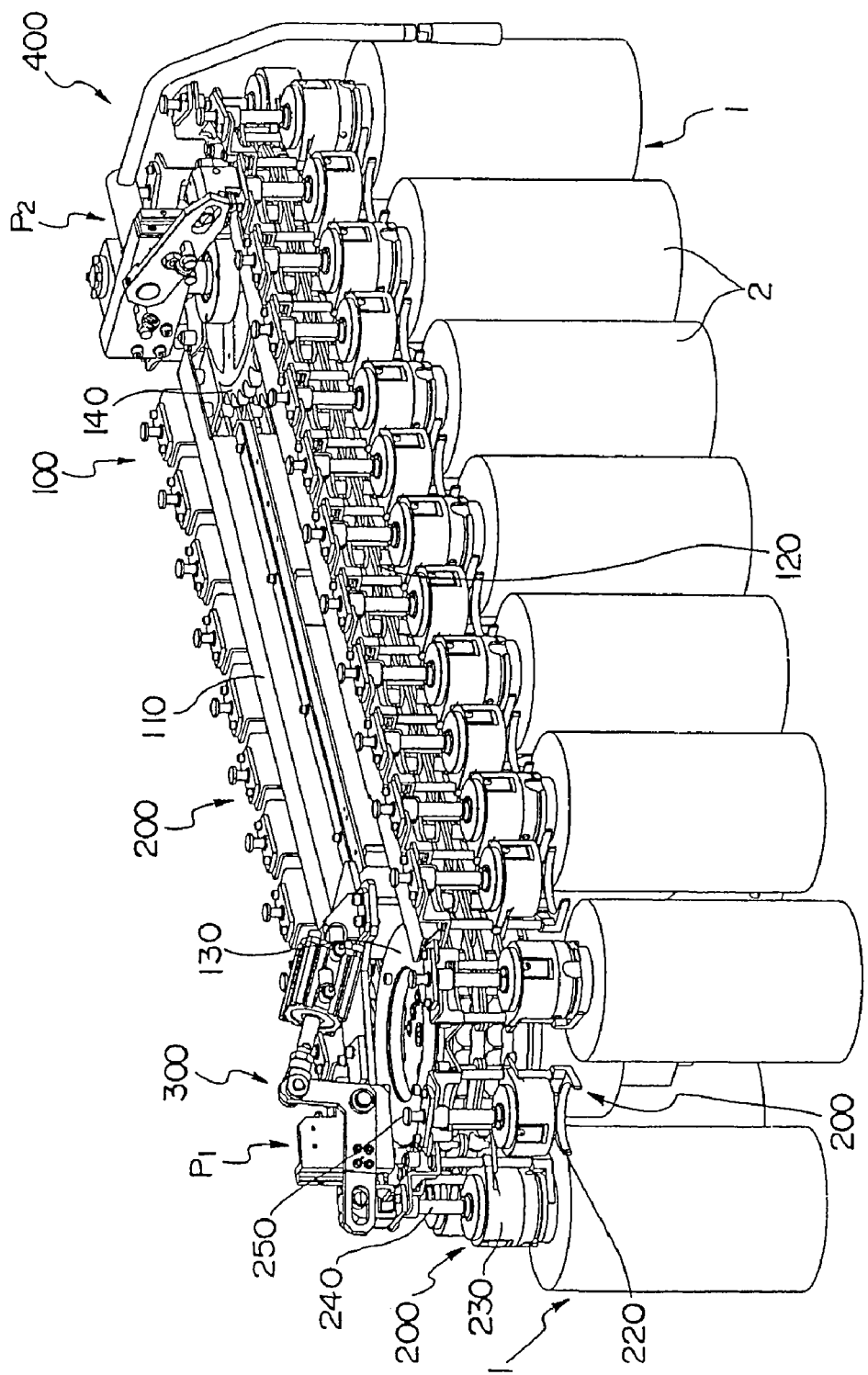
FIG. 1 is a perspective view showing the whole tool magazine device according to the present invention.

FIG. 1 is a perspective view showing the whole tool magazine device according to the present invention.

The tool magazine device shown as a whole by reference number 100 comprises a frame 110, having a chain 120 movably suspended between sprocket wheels 130 and 140 disposed on both ends of the frame 110. A number of tool holders 200 are attached to the chain 120.

The tool holders 200 support tools 1 in a removable manner, and the number thereof is selected according to the number of necessary tools. For example, the tool holders can be arranged to hold sixty tools.

The tool magazine device 100 includes an automatic tool changing station $P_1$ positioned on one end and a manual tool changing station $P_2$ positioned on the other end where sprocket wheels 130 and 140 are arranged respectively. The automatic tool changing station $P_1$ is equipped with an automatic tool change preparation device 300, and the manual tool changing station $P_2$ is equipped with a manual tool change preparation device 400.

Figure 2:
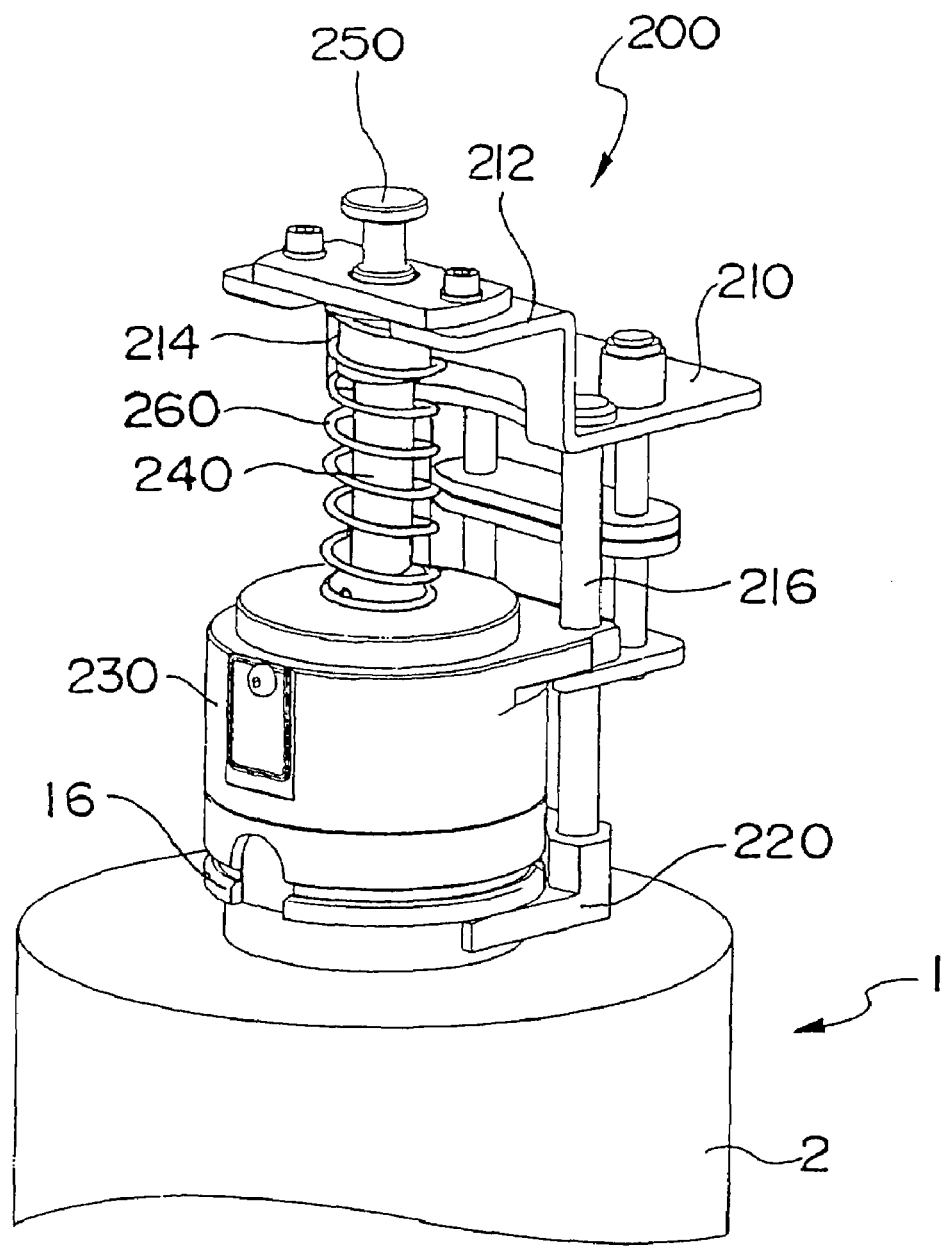
FIG. 2 is an explanatory view showing the structure of the tool holder.
Figure 3:
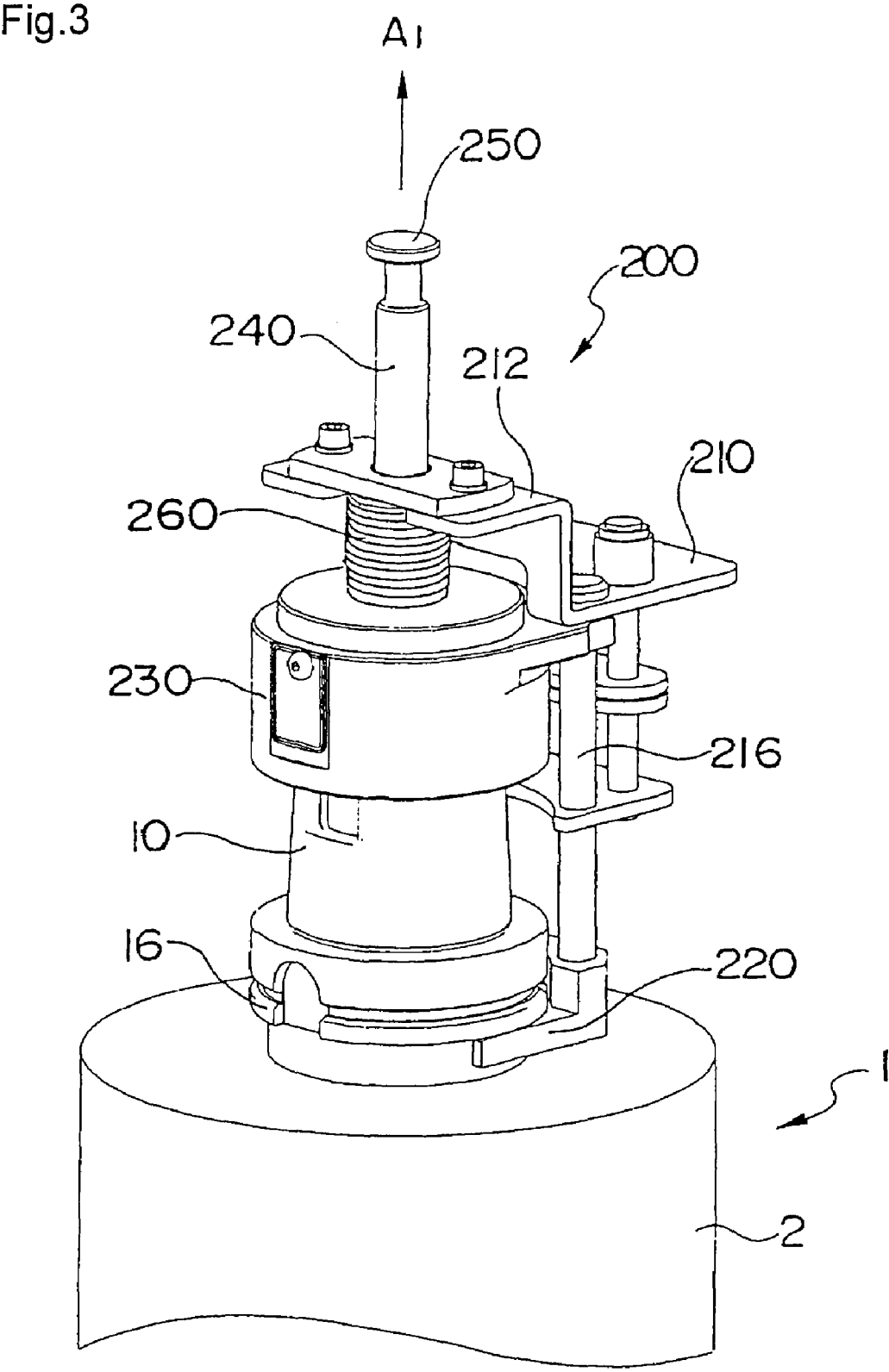
FIG. 3 is an explanatory view showing the structure of the tool holder.
Figure 4:
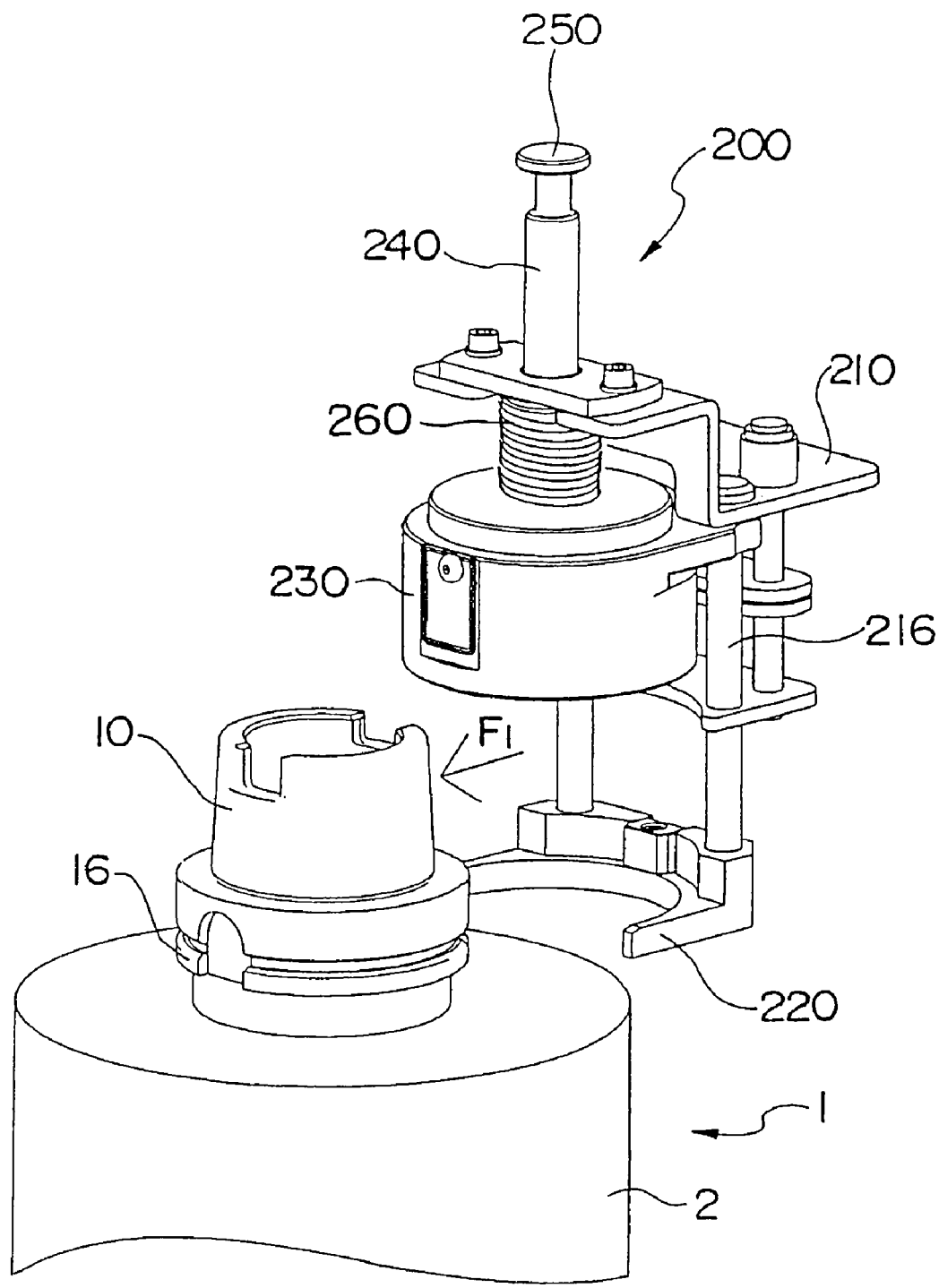
FIG. 4 is an explanatory view showing the structure of the tool holder.

FIGS. 2 through 4 are explanatory views showing the structure of the tool holder 200.

In FIG. 2, the tool holder 200 comprises a chain member 210 constituting a portion of the chain 120, and a supporting plate 212 formed by bending the upper panel of the chain member 210 upward. The supporting plate 212 is equipped with a slide bearing 214 to which is slidaly inserted a shaft 240 of a shank pod described in detail later.

A pair of masts 216 is attached to the chain member 210, and a fork-like tool holder member 220 is attached to the lower end of the masts 216. The tool holder member 220 is inserted to a flange portion 16 of a tool shank, thereby supporting the tool 1.

The shank pod 230 covering the tool shank of the tool 1 is connected to the shaft 240, and a knob 250 is formed on the upper portion of the shaft 240.

A coil spring 260 is disposed on the outer circumference of the shaft 240 between the lower surface of the chain member 210 and the shank pod 230.

FIG. 3 illustrates the state in which the knob 250 is pulled up toward the direction of arrow $A_1$ by the automatic tool change preparation device or the manual tool change preparation device. The shaft 240 integrated with the knob 250 is guided via the slide bearing 214 and elevated while compressing the coil spring 260. The shank pod 230 attached to the lower end of the shaft 240 and protecting the tool shank 10 also elevates to a position beyond the upper end of the tool shank 10.

FIG. 4 shows the state in which the tool 1 is pulled out from the tool holder 200 in the direction of arrow $F_1$ either via an automatic tool change arm or manually, with the shank pod 230 positioned at the elevated position.

A new tool can be inserted to an emptied tool holder 200. When the tool change operation is completed in the tool holder 200, the shaft 240 is lowered via the knob 250 and the shank pod 230 covers the tool shank 10.

Figure 5:
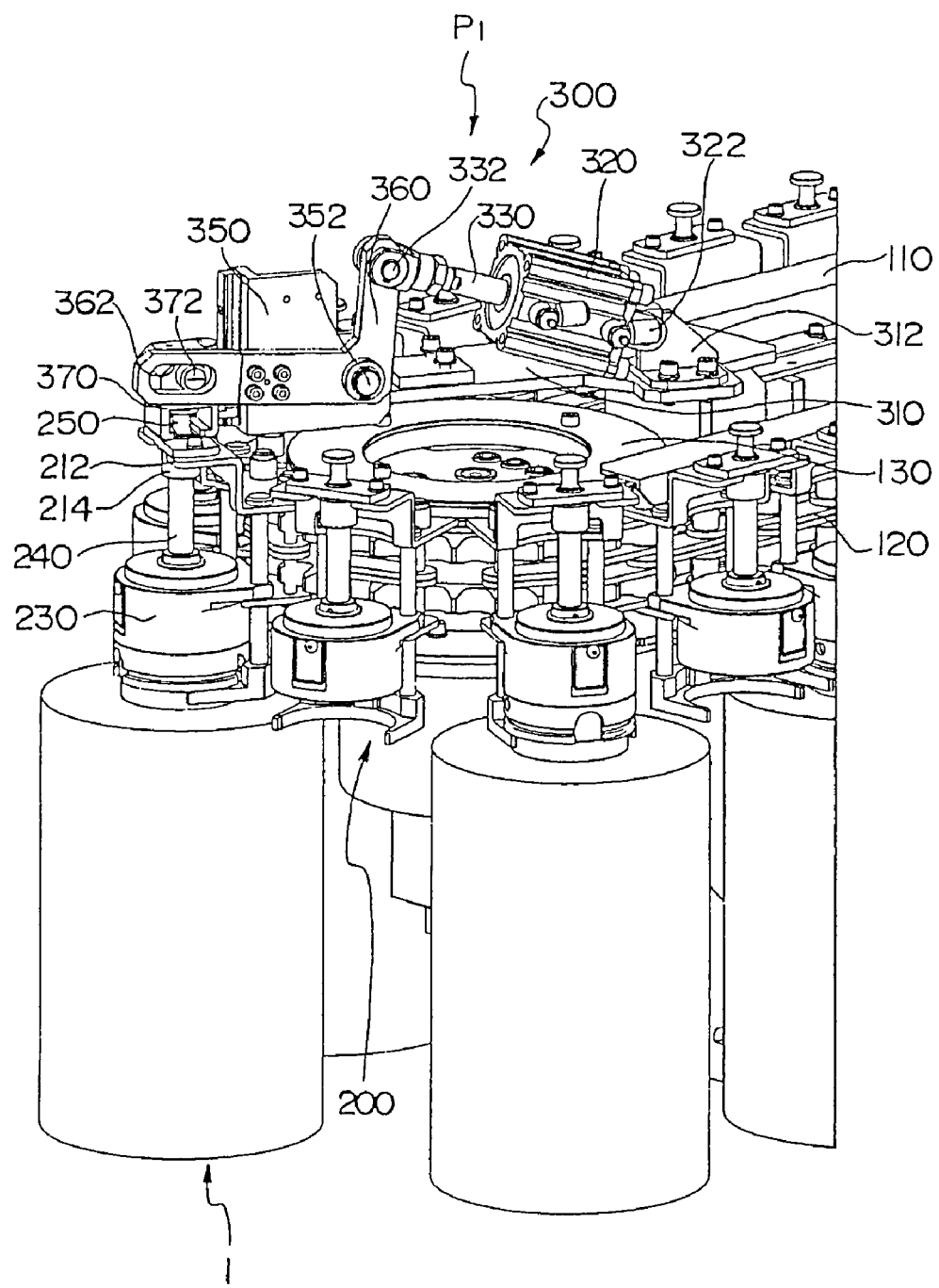
FIG. 5 is an explanatory view of an automatic tool change preparation device.

FIG. 5 is an explanatory view showing the structure of the automatic tool change preparation device 300 disposed in the automatic tool changing station $P_1$.

The automatic tool change preparation device 300 has a base plate 310 fixed to the frame 110 of the tool magazine device.

The base plate 310 has a bracket 312 mounted thereon, and on the bracket is supported a rear end portion 322 of an air cylinder 320 so as to be able to move in swinging motion. A front end portion of a piston pod 330 driven by the air cylinder 320 is connected via a pin 332 to a crank lever 360.

The crank lever 360 is pivotally mounted via a pin 352 to a bracket 350 mounted to the base plate 310.

A slit 362 is provided on the leading end of the crank lever 360, to which is loosely fit a pin 372 of an elevating head 370. The elevating head 370 has a slit through which a knob 250 passes, and the knob 250 of the tool holder 200 having reached the automatic tool changing position is engaged to the slit of the elevating head 370. When the tool holder 200 being the object of automatic tool change reaches this position, the automatic tool change preparation device 300 operates to pivot the crank lever 360. The elevating head 370 elevates, along with which the shaft 240 and the shank pod 230 together with the knob 250 are elevated to the position shown in FIG. 4.

In this state, the tool of the tool holder 200 can be automatically changed via a tool changing arm of the automatic tool changing device not shown. When the automatic tool change is completed, the crank lever 360 is pivoted in the opposite direction and the elevating head 370 is lowered. The shank pod 230 of the tool holder 200 is disposed so as to cover the tool shank and protect the tool shank.

The tool holder 200 having its tools changed is moved along with the movement of the chain 120.

Figure 6:
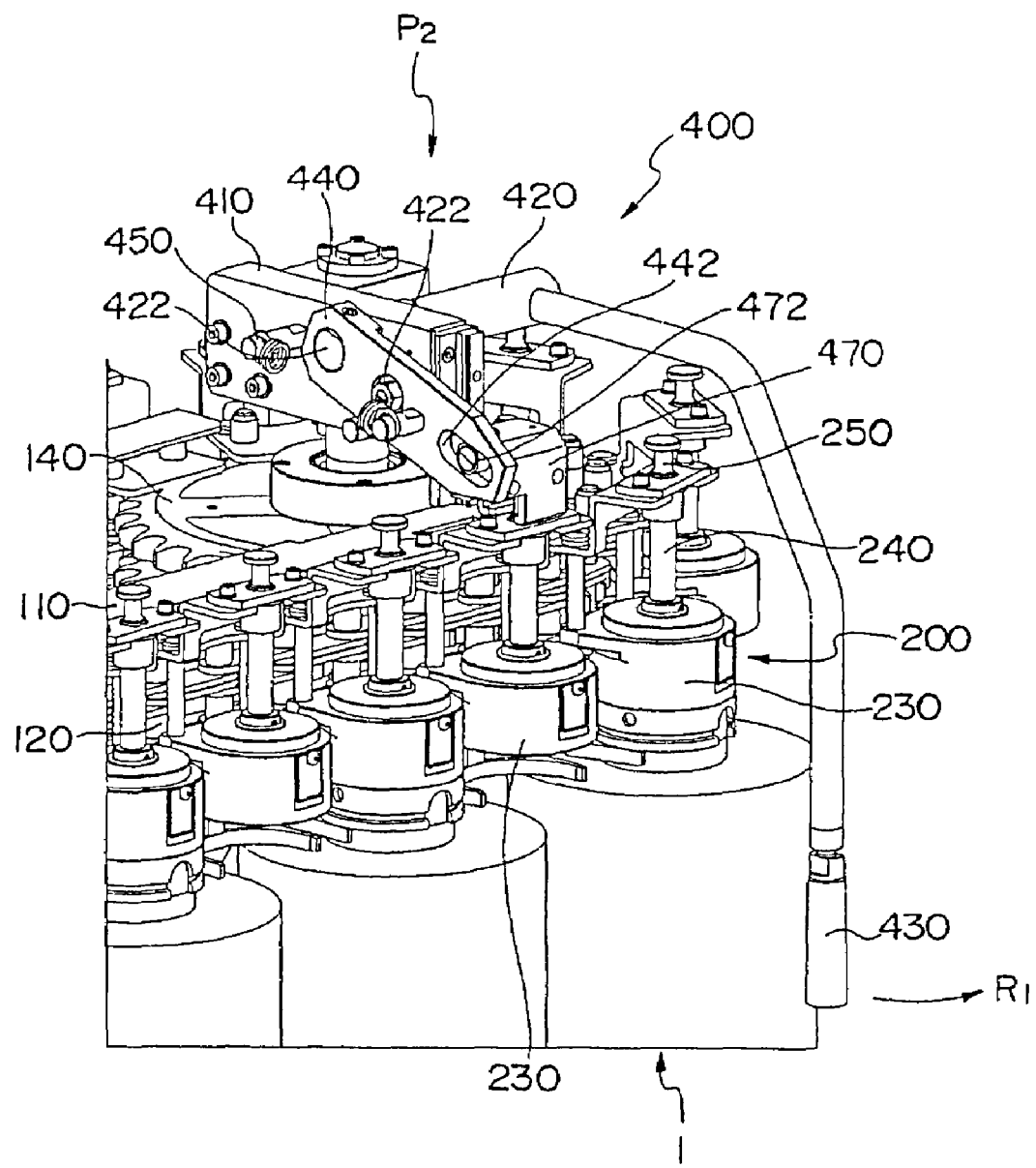
FIG. 6 is an explanatory view of a manual tool change preparation device.
Figure 7:
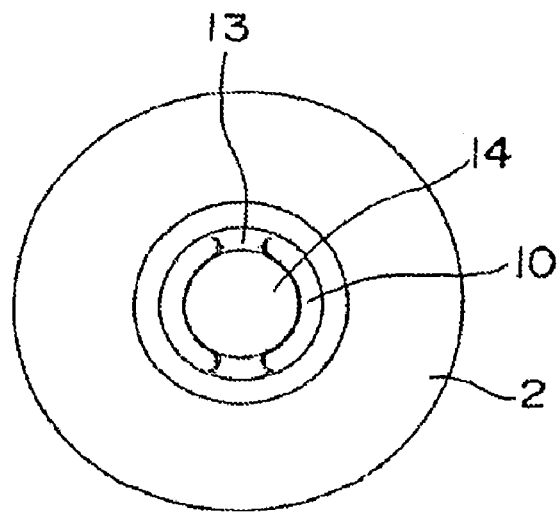
FIG. 7 is an explanatory view of a tool.
Figure 7:
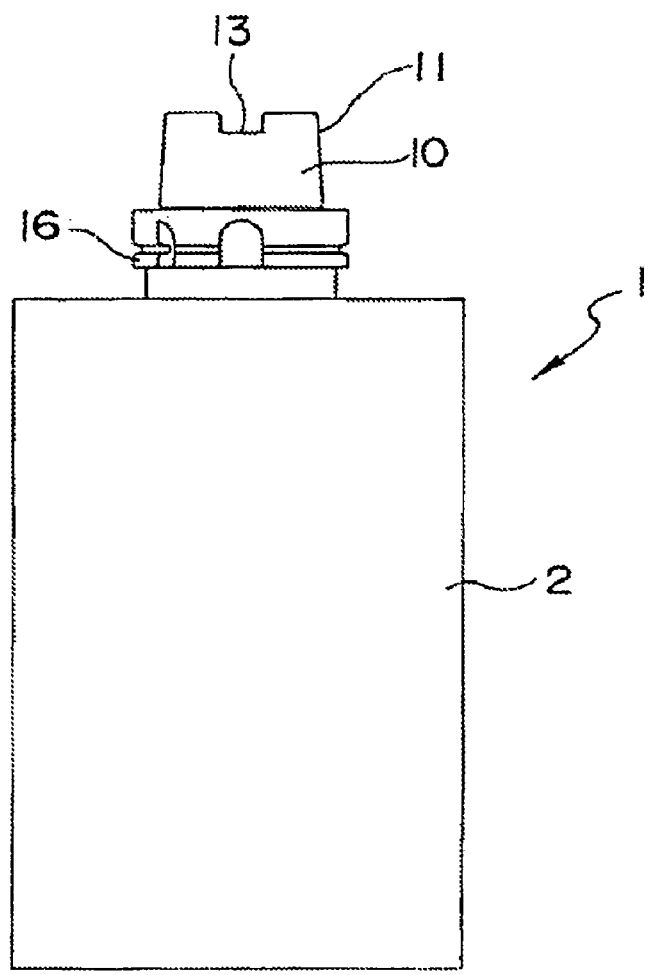
Figure 8:
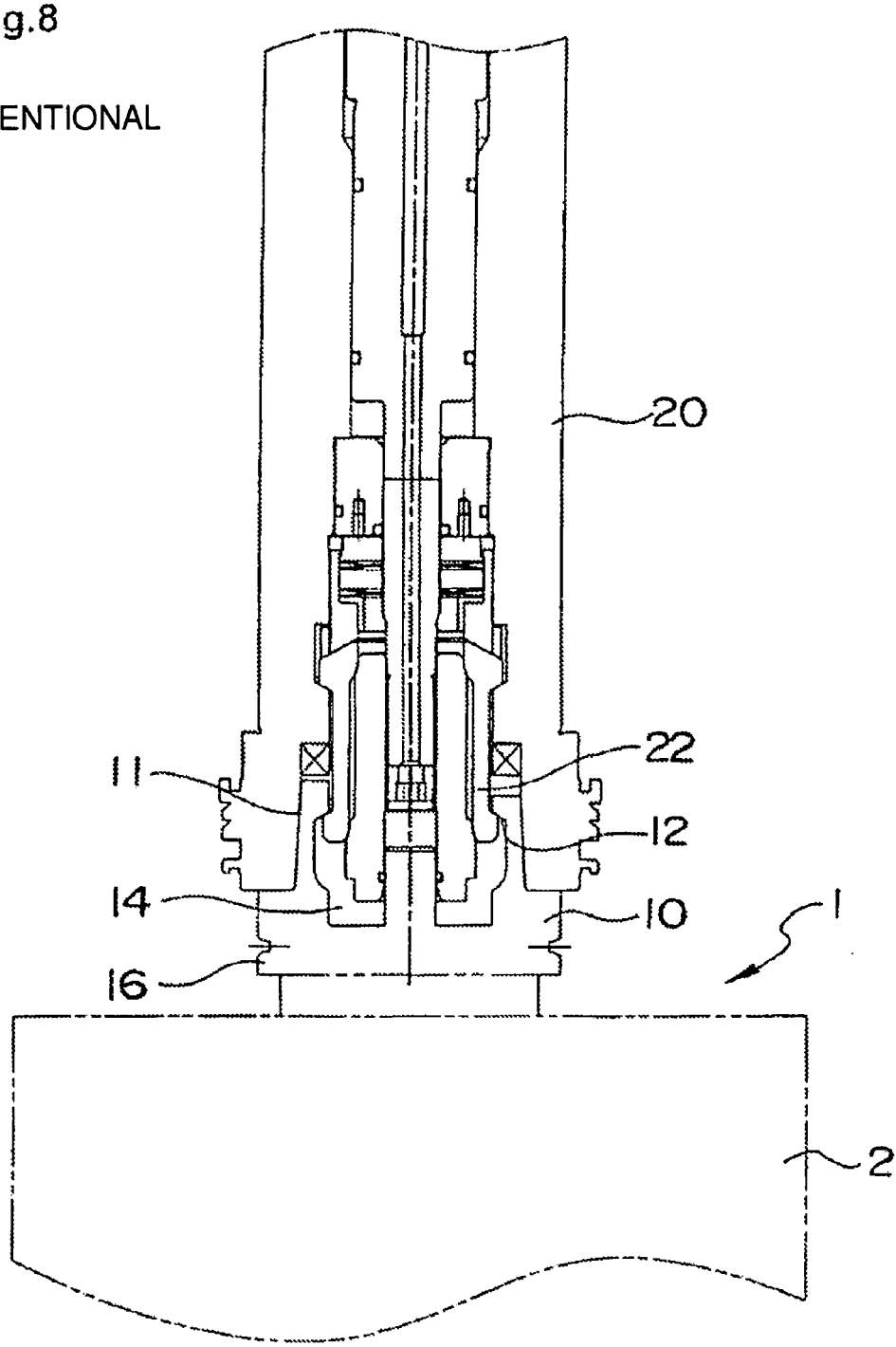
FIG. 8 is an explanatory view of a spindle of a vertical machining center.

FIG. 6 is an explanatory view showing the structure of the manual tool change preparation device 400 disposed on the manual tool changing station $P_2$.

The manual tool change preparation device 400 has a bracket 410 fixed to the frame 110 of the tool magazine device. The bracket 410 has a shaft 420 pivotally supported thereon, and on the end of the shaft 420 is mounted a manual operation handle 430.

A lever 440 is supported so as to be able to move in swinging motion on the bracket 410, and on the rear end of the lever 440 is engaged a cam 442 integrated with the shaft 420. A slit 442 is formed on the leading end of the lever 440, and an elevating head 470 is attached thereto via a pin 472.

When the operator rotates the manual handle 430 in the direction of arrow $R_1$, the shaft 420 rotates the lever 440 resisting against the force of the return spring 450. When the lever 440 rotates, the elevating head 470 elevates, and the knob 250 of the tool holder 220 is elevated therewith.

By this operation, the shaft 240 and the shank pod 230 elevates to the upper position of the tool shank. When the cam 422 passes the point of action of the return spring 450, the elevating head 470 will be maintained at the elevated position even when the manual handle 430 is released.

Therefore, the operator can let go of the manual handle 430 and change the tool 1.

After the changing of tools is completed, the operator pulls down the manual handle 430 to lower the elevating head 470, so that the shank pod 230 is disposed to cover the upper portion of the tool shank.

As described, since the tool magazine device of the present invention is equipped with a shank pod for covering the tool shank and the shank pod is elevated at the tool change position, the tools can be changed using a tool change arm within a horizontal plane.

What is claimed is:

1. A tool magazine device disposed in a vertical machining center for storing tools to be provided to a spindle of a machine tool via an automatic tool change device, the tool magazine device comprising:
   a chain suspended between a pair of sprocket wheels and moved thereby; and
   a vertical tool holder attached to the chain, the tool holder comprising a shank pod that covers a tool shank, and an elevating means for elevating and lowering the shank pod while the shank pod remains attached to the chain.

2. The tool magazine device disposed in a vertical machining center according to claim 1, wherein the tool magazine device has an automatic tool change preparation device disposed on a side where one of the sprocket wheels is placed, and the automatic tool change preparation device has a function to automatically elevate and lower the shank pod of the tool holder.

3. The tool magazine device disposed in a vertical machining center according to claim 1, wherein the tool magazine device has a manual tool change preparation device disposed on a side where one of the sprocket wheels is placed, and the manual tool change preparation device has a function to manually elevate and lower the shank pod of the tool holder.

4. The tool magazine device disposed in a vertical machining center according to claim 1, wherein the tool shank has a tool clamping opening formed to open to the upper direction.

5. The tool magazine device disposed in a vertical machining center according to claim 1, wherein the vertical tool holder is configured to maintain the vertical position of the tool shank relative to the chain while the elevating means elevates the shank pod to expose the tool shank in order to permit horizontal insertion/removal of the tool shank into/from the vertical tool holder.

6. The tool magazine device disposed in a vertical machining center according to claim 5, wherein the vertical tool holder is configured to maintain the vertical position of the tool shank relative to the chain while lowering the shank pod in order to cover the tool shank following horizontal insertion of the tool shank into the vertical tool holder.

7. A tool magazine device disposed in a vertical machining center for storing tools to be provided to a spindle of a machine tool via an automatic tool change device, the tool magazine device comprising:
   a chain suspended between a pair of sprocket wheels and moved thereby; and
   a vertical tool holder attached to the chain, the tool holder comprising a shank pod for covering a tool shank, a coil spring biasing the shank pod toward the tool shank, and an elevating means for elevating and lowering the shank pod while the shank pod remains attached to the chain.

8. The tool magazine device disposed in a vertical machining center according to claim 7, wherein the tool magazine device has an automatic tool change preparation device disposed on a side where one of the sprocket wheels is placed, and the automatic tool change preparation device has a function to automatically elevate and lower the shank pod of the tool holder.

9. The tool magazine device disposed in a vertical machining center according to claim 7, wherein the tool magazine device has a manual tool change preparation device disposed on a side where one of the sprocket wheels is placed, and the manual tool change preparation device has a function to manually elevate and lower the shank pod of the tool holder.

10. The tool magazine device disposed in a vertical machining center according to claim 7, wherein the tool shank has a tool clamping opening formed to open to the upper direction.

* * * * *